July 25, 1950     T. F. SCHLICKSUPP     2,516,486
BALL BEARING

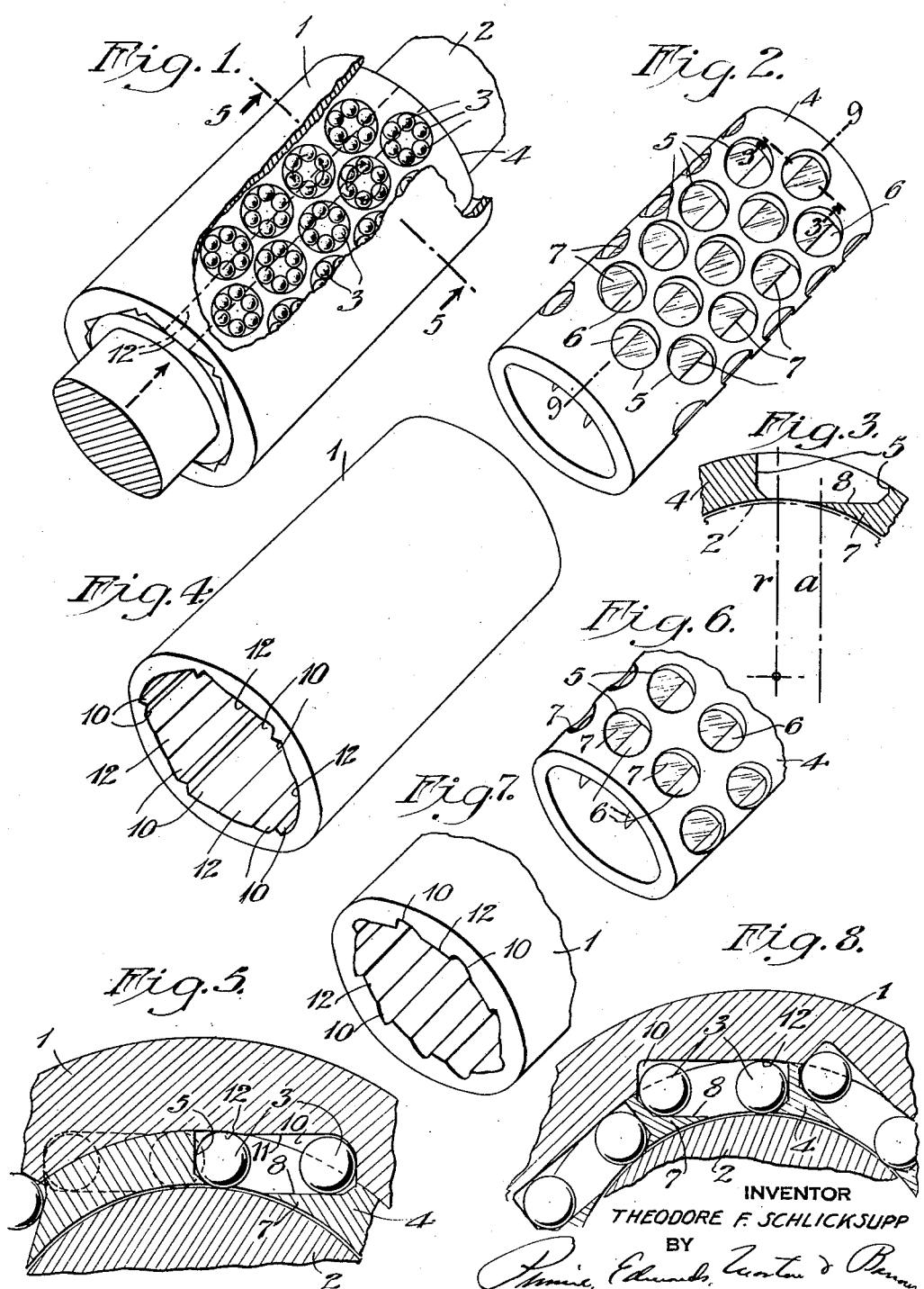

Filed July 27, 1946                                        2 Sheets-Sheet 2

INVENTOR
THEODORE F. SCHLICKSUPP
BY
ATTORNEYS

Patented July 25, 1950

2,516,486

UNITED STATES PATENT OFFICE 2,516,486

BALL BEARING

Theodore F. Schlicksupp, Long Island City, N. Y.

Application July 27, 1946, Serial No. 686,635

13 Claims. (Cl. 308—6)

This invention relates to ball bearings, and more particularly to ball bearings that permit relative rectilinear movement between a shaft and a surrounding bushing.

Ball bearings of this type, herein called the sliding type, have been proposed in which a series of individual ball circuits are contained within the bushing, each circuit being a closed circuit elongated lengthwise of the shaft and shaped like a flattened ellipse with parallel sides. The bushing has a series of longitudinally extending clearances in its inner surface each of which is located over one run of a corresponding ball circuit so that the balls of each circuit have positive rolling contact with the shaft and the inner surface of the bushing when they are in one run of the circuit but not when they are in the other run. Therefore, relative longitudinal movement of the shaft and bushing positively rolls the balls in each individual circuit along the run over which there is no clearance and the balls return in the other run which has the clearance.

Heretofore this type of ball bearing has been difficult and expensive to manufacture, due mainly to the manner in which it has been necessary to make the race member which lies between the bushing and the shaft and which contains the guiding channels for the balls. To produce this member it has been necessary to form in a sleeve a series of openings elongated lengthwise of the sleeve and then to fasten centrally within each of the openings an island of metal which converts the opening into a ball guiding channel having the shape of a flattened or elongated annulus. Therefore a large number of parts is required to make up the race member and the assembling of them is time consuming and expensive.

The principal object of this invention is to provide a sliding type ball bearing having an improved one-piece race member for the balls.

Another object of the invention is to provide an improved type of ball bearing which, in certain of its forms, will permit not only relative rectilinear movement between a shaft and its surrounding bushing but relative rotation as well.

A further object is to provide an improved one-piece race member adapted in some of its forms for use in a ball bearing of the sliding type and adapted in other of its forms for use in a ball bearing of the combined sliding and rotary type.

A ball bearing embodying the invention, and several modified forms thereof, are illustrated in the accompanying drawings, in which:

Figure 1 is a perspective view of one form of bearing embodying the invention, a portion of the bushing being broken away to expose a portion of the race member and the balls located in the ball races;

Fig. 2 is a perspective view of the race member alone;

Fig. 3 is an enlarged partial transverse section taken on the line 3—3 of Figure 2;

Fig. 4 is a perspective view of the bushing alone;

Fig. 5 is a partial transverse section through the assembled bearing shown in Fig. 1 taken approximately on the line 5—5 in that figure;

Figure 6 is a perspective view of a portion of a race member adapted for use in a modified form of the bearing;

Fig. 7 is a perspective view of a portion of a bushing adapted for use with the kind of race member shown in Fig. 6;

Fig. 8 is a partial transverse section through an assembled bearing of the kind produced by assembling the race member and bushing shown in Figs. 6 and 7;

Figure 9:
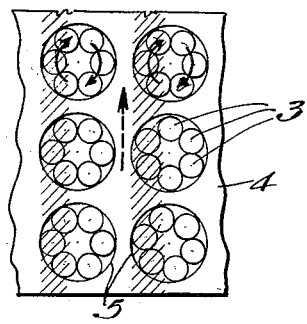
Fig. 9 is a development of a portion of a race member of a different type adapted for use in a further modified form of bearing.

Referring first to Figs. 1–4, the bearing therein illustrated comprises a bushing 1 adapted to surround a shaft 2. The internal diameter of the bushing is greater than the external diameter of the shaft to accommodate the balls 3 of the bearing. A sleeve 4, constituting the race member, is held within the bushing 1 with a force fit or in any other suitable way. The internal diameter of the race member 4 is slightly larger than the diameter of the shaft 2 so that the shaft and race member can slide freely relative to each other.

As best shown in Fig. 2 the race member is provided with a number of individual ball races formed by circular recesses 5 distributed throughout its surface. The circular recesses are arranged in a number of rows extending lengthwise of the race member. A minor lateral portion of each circular recess is relatively deep and extends entirely through the thickness of the race member as shown at 6 and the remaining major portion of each circular recess is of less depth than the thickness of the race member, leaving a web-like bottom or floor 7 in this portion of the recess. Fig. 3 shows a section through one of the circular recesses, and as shown at 8 in this figure, the upper surface of the bottom portion 7 of each recess lies in a plane which is substantially tangent to the portion of the shaft that lies under the through-portion 6 of the recess when the shaft is in the race member.

Ball races of the kind described can be formed in the race member by drilling circular openings or recesses with a counter bore or milling tool in the race member in the direction of a radius $r$ of the race member but along an axis $a$ which lies parallel to the radius and slightly to one side of it, so that the tool will break through the wall of the race member throughout a small portion only of each circular recess. Preferably, however, the race member with ball races of the type described is made by a die casting operation.

With respect to any one row of circular recesses 5, it may be said that corresponding minor portions of the recesses at one side of an imaginary straight line 9—9 that intersects all of the recesses of the row and that is parallel to the sleeve axis, are through-portions that extend entirely through the thickness of the sleeve, and the major portions of the recesses of the row at the other side of said line are of less depth than the thickness of the sleeve, thereby leaving solid web-like bottoms 7 of the kind above described. For reasons which will hereinafter be made clear the ball races are preferably so formed in the sleeve 4 that the through-portions 6 of different pairs of rows of recesses 5 are adjacent.

The race member made as above described is positioned within the bushing 1, shown alone in Fig. 4, but first each circular recess 5 is loaded with a set of the balls 3. As best shown in Fig. 1, the balls are of such size that they form a circular series of balls in contacting relation adapted to roll in contact with and be guided by the circular wall of the recess in which they are located. In other words, the balls in each recess 5 can roll in a circular orbit in contact with the circular wall of the recess.

The bushing 1 is provided on its inner surface with a number of recesses 10 which extend lengthwise of the bushing. When the race member is positioned in the bushing each clearance 10 is made to lie over a row of the web-like bottom portions 7 of a row of the circular recesses 5 in the race member. As best shown in Fig. 5 the bottom wall 11 of each recess 10 is in substantial parallelism with the surfaces 8 of the bottom portions of the row of circular recesses over which the clearance lies. The recesses 10 are so formed in the inner surface of the bushing that there is left on the bushing's inner surface a number of unrecessed portions 12, each of which constitutes a load area that lies over the through-portions 6 of a pair of rows of the circular recesses 5.

It will now be seen that those balls in each circular recess of the race member that happen to be in the deep or through-portion of the recess are in positive rolling contact with the shaft and with a load area 12 on the inner surface of the bushing which lies above them. The remaining balls in each circular recess roll on the flat surface 8 of the solid bottom portion 7 of the circular recess. These balls being out of contact with the shaft carry no load and are permitted free movement, the clearance above them in the inner surface of the bushing being deep enough to allow them to move freely. Because of the fact that the deep or through-portion of each circular recess 5 constitutes a minor portion of the recess, only a few of the balls at one side of the recess will make contact with the shaft and with the load area on the inner surface of the bushing which lies over the deep portion of the recess. This is clear from Fig. 1 in which the relationship between one of the load areas 12 on the bushing and the balls in two adjacent rows of ball races is shown by the parallel dot-and-dash lines. It will be evident from Fig. 1 that when the shaft and bushing are moved rectilinearly relative to each other, for instance when the shaft is moved in the direction of the dotted-line arrow, the balls in each race that lie in the deep or through-portion of the recess will be positively rolled in the direction of movement of the shaft because they are carrying the load and are in rolling contact with both the shaft and the load area 12 on the inner surface of the bushing. The rectilinear movement of the shaft tends to roll the load-carrying balls in a straight line in the direction of movement of the shaft, but the curved wall of each circular recess directs the balls in that recess in a circular path so that the balls in all of the recesses in the righthand row shown in Fig. 1 will progress in a clockwise direction while those in the lefthand row will progress in a counterclockwise direction as shown by the full-line arrows. Of course, if the movement of the shaft is in the opposite direction the circular progression of the balls in each opening will be in the opposite direction from that indicated by the arrows. Each circular recess in the race member therefore causes the set of balls in it to move in an endless path, the load-carrying balls being positively rolled in one direction by the relative movement between the shaft and the bushing and the balls that carry no load being returned in the opposite direction. The returning balls move freely on the bottom portion 7 of the ball race out of contact with the shaft. One advantage of keeping the returning balls out of contact with the shaft is that they can be pushed along or rolled freely in the return direction, whereas if the bottom portions 7 were not provided to keep the returning balls out of contact with the shaft, they would have a tendency, whenever in contact with the shaft, to slide because the rectilinear movement of the shaft would try to roll them in the direction of movement of the shaft while they are being forced to move along in the opposite direction in the return portion of the circular recess by the positive rolling action of the load-carrying balls. While the bottom portions 7 of the ball races are used in the preferred form of the invention because of this advantage, they nevertheless can be omitted, as in certain modified forms of the invention to be later described.

Instead of making the race member so that the through-portions 6 of different pairs of rows of circular recesses are adjacent, as above described, it may be made as shown in Fig. 6, so that the through-portions 6 of all of the rows of circular recesses 5 are at the same side of the recesses. Fig. 7 shows a bushing suitable for use with a race member of the kind shown in Fig. 6, and Fig. 8 is a partial transverse section of an assembled bearing having a race member and bushing of the kind shown in Figs. 6 and 7. As shown in Fig. 7 the inner surface of the bushing is recessed to provide alternate clearances 10 and load areas 12. Each load area 12 lies over a single row of through-portions 6 of one row of the circular recesses in the race member, and each clearance 10 lies over a row of the bottom portions 7 of a single row of the recesses. The type of bearing previously described in which each load area on the bushing is common to the through-portions of two adjacent rows of circular recesses in the race member is preferred since the ball races can then be staggered and positioned close together, thus permitting the race member to have more rows of them to accommodate a larger number of balls, whereas in the type of bearing shown in Figs. 6–8, the ball races cannot be staggered and overlapped.

Figure 10:
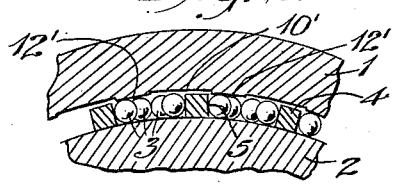
Fig. 10 is a partial transverse section through an assembled bearing having a race member of the type shown in Fig. 9.

As stated above, the circular recesses in the race member may extend through the thickness of the race member throughout their entire area. In other words, the previously described bottom portion 7 in each of the circular recesses may be omitted. Fig. 9 shows a development of a portion of a race member of this type and Fig. 10 shows a partial transverse section of an assembled bearing having this type of race member. The bushing 1 has longitudinally extending recesses or clearances 10' in its inner surface alternating with unrecessed portions 12' forming load areas. In Fig. 9 the shaded areas represent the load portions on the inner surface of the bushing. Each load area is individual to one row of the circular recesses 5 in the race member and lies over a minor portion of the recesses in the row, and in this respect the bearing is similar to that shown in Figs. 6–8. Rectilinear movement of the shaft relative to the bushing in the direction of the dotted-line arrow will roll the balls in each race in a clockwise direction as indicated by the full-line arrows. Even though the returning balls do not roll on ledges or bottom portions in the circular recesses as in the forms of the bearing previously described, they nevertheless are permitted free movement in a direction opposite to the direction in which the shaft moves because of the clearance 10' in the inner surface of the bushing which lies over them.

Figure 11:
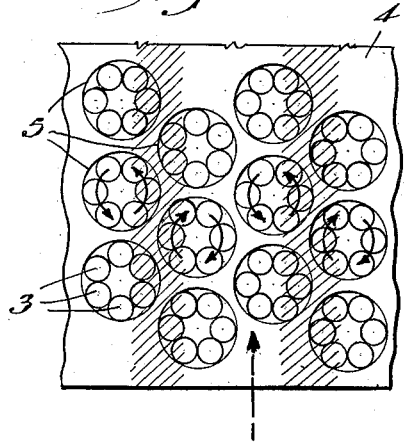
Fig. 11 is a development of a portion of a race member adapted for use in a still further modified form of bearing.

Fig. 11 shows a development of a portion of a race member in which the ball races are formed in the same way as in Fig. 9 but the circular recesses 5 are staggered and are in overlapping relation and each load area on the bushing is common to two adjacent rows of the ball races as indicated by the shaded areas. This is the same relative arrangement of load areas and ball races as employed in the type of bearing shown in Figs. 1 to 5.

Figure 12:
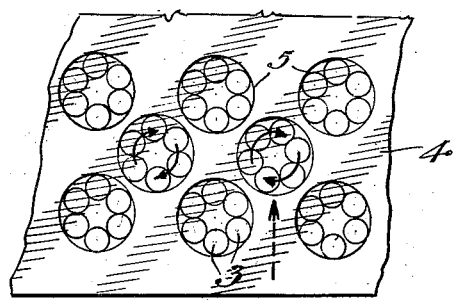
Fig. 12 is a development of a portion of a race member adapted for use in a modified form of bearing which will permit relative rotary motion between the bushing and shaft as well as relative rectilinear movement.

If desired, each row of circular recesses in the race member shown in Fig. 9 may be disposed at an angle with respect to the shaft, preferably an angle of 45°, as shown in Fig. 12, and the recesses in the inner surface of the bushing 1 may be similarly inclined so that the load portions on the inner surface of the bushing, indicated by the shaded areas in Fig. 11, will have a corresponding inclination. This type of bearing will permit not only relative rectilinear movement between the shaft and the bushing but relative rotation as well. For instance, rectilinear movement of the shaft in the direction of the dotted arrow will cause the balls in each ball race to rotate in a clockwise direction as indicated by the full-line arrows, and rotation of the shaft in a clockwise direction will cause similar rotation of the balls in the races.

Similarly, the race member shown in Fig. 11, and the bushing for use with it, can be adapted for use in a bearing of the combined sliding and rotary type. This is shown in Fig. 13 in which the rows of ball races are arranged at an angle with respect to the axis of the shaft, preferably an angle of 45°, as in Fig. 12, and the load areas on the inner surface of the bushing, each of which is common to two rows of ball races, are correspondingly inclined.

Figure 13:
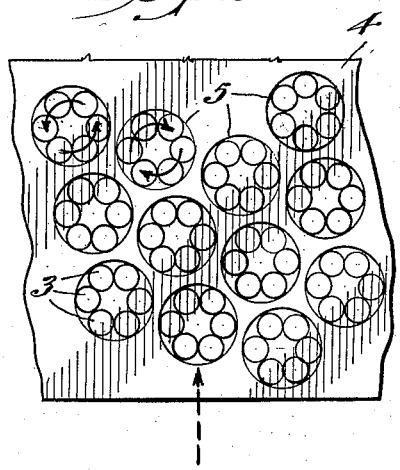
Fig. 13 is a development of a portion of a race member adapted for use in a further modified form of bearing of the combined sliding and rotary type.

The types of bearings that have ledges or bottom portions in the circular recesses for the returning balls, illustrated in Figs. 1–8, may be similarly modified to convert them into bearings of the combined sliding and rotary type by inclining the rows of ball races and correspondingly inclining the clearances and load areas on the inner surface of the bushing as depicted in Figs. 12 and 13.

I claim:

1. A ball bearing comprising a shaft, a bushing surrounding the shaft, a race member between the bushing and shaft, said race member having a plurality of circular recesses arranged in rows extending lengthwise of the race member and constituting individual ball races, and a circular series of balls in each recess, the balls and the recess in which they are located being so related in size that the balls maintain themselves in contacting relation and in rolling contact with the circular wall of the recess, the inner surface of the bushing having a plurality of recesses extending lengthwise of the bushing and forming clearances adjacent each of which is an unrecessed portion on the inner surface of the bushing forming a load area, each of said clearances overlying a part only of the recesses in one of said rows of recesses in the race member and the adjacent load area overlying the remaining part of the recesses in said row.

2. A ball bearing comprising a shaft, a bushing surrounding the shaft, a race member between the bushing and shaft, said race member having a plurality of circular recesses arranged in rows extending lengthwise of the race member and constituting individual ball races, and a circular series of balls in each recess, the balls and the recess in which they are located being so related in size that the balls maintain themselves in contacting relation and in rolling contact with the circular wall of the recess, the inner surface of the bushing having a plurality of recesses extending lengthwise of the bushing and forming clearances adjacent each of which is an unrecessed portion on the inner surface of the bushing forming a load area, each of said clearances overlying a major portion of the recesses in one of said rows of recesses in the race member and the adjacent load area overlying a minor portion of the recesses in said row.

3. A ball bearing comprising a shaft, a bushing surrounding the shaft, a race member between the bushing and shaft, said race member having a plurality of circular recesses arranged in rows extending lengthwise of the race member and constituting individual ball races, and a circular series of balls in each recess in contacting relation and adapted to roll in contact with and be guided by the circular wall of the recess, the inner surface of the bushing having a plurality of recesses extending lengthwise of the bushing and forming clearances adjacent each of which is an unrecessed portion on the inner surface of the bushing forming a load area, each of said clearances overlying a part only of the recesses in two adjacent rows of the recesses in the race member.

4. A ball bearing comprising a shaft, a bushing surrounding the shaft, a race member between the bushing and shaft, said race member having a plurality of circular recesses arranged in rows extending lengthwise of the race member and constituting individual ball races, and a circular series of balls in each recess in contacting relation and adapted to roll in contact with and be guided by the circular wall of the recess, the inner surface of the bushing having a plurality of recesses extending lengthwise of the bushing and forming clearances adjacent each of which is an unrecessed portion on the inner surface of the bushing forming a load area, each of said load areas overlying a part only of the recesses in two adjacent rows of recesses in the race member, the remaining part of the recesses in said two adjacent rows being overlaid by the clearances at opposite sides of the load area.

5. A ball bearing comprising a shaft, a bushing surrounding the shaft, a race member between the bushing and shaft, said race member having a plurality of circular recesses arranged in rows extending lengthwise of the race member and at an angle of 45° with respect to the axis of the shaft and constituting individual ball races, and a circular series of balls in each recess in contacting relation and adapted to roll in contact with and be guided by the circular wall of the recess, the inner surface of the bushing having a plurality of recesses extending lengthwise of the bushing and at an angle of 45° with respect to the axis of the shaft and adjacent each of which is an unrecessed portion on the inner surface of the bushing forming a load area, each of said clearances overlying a part only of the recesses in one of said rows of recesses on the race member and the adjacent load area overlying the remaining part of the recesses in said row.

6. A ball bearing comprising a shaft, a bushing surrounding the shaft, a race member between the bushing and shaft, said race member having a plurality of circular recesses arranged in rows extending lengthwise of the race member and constituting individual ball races, and a circular series of balls in each recess in contacting relation and adapted to roll in contact with and be guided by the circular wall of the recess, the inner surface of the bushing having a plurality of recesses extending lengthwise of the bushing and forming clearances adjacent each of which is an unrecessed portion on the inner surface of the bushing forming a load area, each of said clearances overlying a part only of the recesses in one of said rows of recesses in the race member and the adjacent load area overlying the remaining part of the recesses in said row, the portion of each of said recesses in the race member that lies under a load area on the inner surface of the bushing extending entirely through the thickness of the race member and the portion of each recess in the race member that lies under a clearance in the inner surface of the race member being of less depth than the thickness of the race member.

7. A bearing in accordance with claim 2 in which said minor portion of each recess in the race member that lies under a load area on the inner surface of the bushing extends entirely through the thickness of the race member, and in which said major portion of each recess that lies under a clearance in the inner surface of the bushing is of less depth than the thickness of the race member.

8. A bearing in accordance with claim 3 in which the portion of each recess in the race member that lies under a load area on the inner surface of the bushing extends entirely through the thickness of the race member and the portion of each recess in the race member that lies under a clearance in the inner surface of the bushing is of less depth than the thickness of the race member.

9. A bearing in accordance with claim 4 in which the portion of each recess in the race member that lies under a load area on the inner surface of the bushing extends entirely through the thickness of the race member and the portion of each recess in the race member that lies under a clearance in the inner surface of the bushing is of less depth than the thickness of the race member.

10. A ball bearing comprising a shaft, a bushing surrounding the shaft, a race member between the bushing and shaft, said race member having a plurality of circular recesses arranged in rows extending lengthwise of the race member and constituting individual ball races, and a circular series of balls in each recess in contacting relation and adapted to roll in contact with and be guided by the circular wall of the recess, the inner surface of the bushing having a plurality of recesses extending lengthwise of the bushing and forming clearances adjacent each of which is an unrecessed portion on the inner surface of the bushing forming a load area, each of said clearances overlying a part only of the recesses in one of said rows of recesses in the race member and the adjacent load area overlying the remaining part of the recesses in said row, the portion of each of said circular recesses in the race member that lies under a load area on the inner surface of the bushing being a through-portion that extends entirely through the thickness of the race member and the remaining portion of each circular recess in the race member that lies under a clearance in the inner surface of the bushing being of less depth than the thickness of the race member thus leaving a web-like bottom in such remaining portion of each circular recess on whose upper surface the balls in that portion of the recess roll, said upper surface being in a plane that is substantially tangent to the portion of the shaft that lies under the through-portion of the circular recess.

11. A race member for ball bearings comprising a sleeve having a plurality of circular recesses arranged in rows extending lengthwise of the sleeve, corresponding portions of the recesses of each row at one side of an imaginary straight line that intersects all of the recesses of a row and that is parallel to the sleeve axis being through-portions that extend entirely through the thickness of the sleeve, and the remaining portions of the recesses of each row at the other side of said line being of less depth than the thickness of the sleeve thereby leaving web-like bottoms in such remaining portions.

12. A race member for ball bearings comprising a sleeve having a plurality of circular recesses arranged in rows extending lengthwise of the sleeve, corresponding minor portions of the recesses of each row at one side of an imaginary straight line that intersects all of the recesses of the row and that is parallel to the sleeve axis being through-portions that extend entirely through the thickness of the sleeve, and the major portions of the recesses of each row at the other side of said imaginary line being of less depth than the thickness of the sleeve thereby leaving web-like bottoms in such major portions.

13. A race member for ball bearings comprising a sleeve having a plurality of circular recesses arranged in rows extending lengthwise of the sleeve, corresponding portions of the recesses of each row at one side of an imaginary straight line that intersects all of the recesses of a row and that is parallel to the sleeve axis being through-portions that extend entirely through the thickness of the sleeve, and the remaining portions of the recesses of each row at the other side of said line being of less depth than the thickness of the sleeve thereby leaving web-like bottoms in such remaining portions, the upper surfaces of the web-like bottoms of each row of said recesses being in a plane that is substantially tangent to the inner circumference of the sleeve.

THEODORE F. SCHLICKSUPP.

REFERENCES CITED

The following references are of record in the file of this patent:

UNITED STATES PATENTS

| Number | Name | Date |
| --- | --- | --- |
| 1,539,299 | Cheney | May 26, 1925 |
| 1,918,108 | Jonkhoff | July 11, 1933 |
| 2,230,442 | Arms | Feb. 4, 1941 |

FOREIGN PATENTS

| Number | Country | Date |
| --- | --- | --- |
| 755,957 | France | 1933 |